United States Patent
Pi-Yu

[11] Patent Number: 4,765,363
[45] Date of Patent: Aug. 23, 1988

[54] INTAKE VALVE FOR TOILET TANK

[76] Inventor: Ou Pi-Yu, No. 9, Alley 2, Lane 247, Kuang-Chou Road, Tainan City, Taiwan

[21] Appl. No.: 900,699

[22] Filed: Aug. 27, 1986

[51] Int. Cl.[4] ............................................ A16K 31/34
[52] U.S. Cl. .................................... 137/414; 137/437
[58] Field of Search ............... 137/414, 426, 437, 451

[56] References Cited

U.S. PATENT DOCUMENTS

| | | |
|---|---|---|
| 1,248,650 | 12/1917 | Gustafson et al. |
| 1,864,402 | 6/1932 | Bodemuller . |
| 2,007,048 | 7/1935 | Goodwin . |
| 2,143,204 | 1/1939 | McCormack . |
| 3,120,372 | 2/1964 | Gresham . |
| 4,094,327 | 6/1978 | Brandelli .................. 137/414 X |
| 4,182,364 | 1/1980 | Gilbert et al. ............. 137/437 X |
| 4,186,765 | 2/1980 | Anderson .................. 137/426 X |
| 4,414,998 | 11/1983 | Rudler et al. .............. 137/414 X |
| 4,573,495 | 3/1986 | Rothe et al. ................ 137/414 |
| 4,574,826 | 3/1986 | Johnson ..................... 137/414 X |

FOREIGN PATENT DOCUMENTS 904715  7/1972  Canada ................. 137/437

*Primary Examiner*—A. Michael Chambers
*Assistant Examiner*—John C. Fox
*Attorney, Agent, or Firm*—Burns, Doane, Swecker & Mathis

[57] ABSTRACT

A floatless water inlet valve for use in toilet tank comprising an inlet pipe, a valve body, a valve arrangement, a valve control device and a central pipe. The valve body includes a dual sleeve tubular member, the lock means end of which is capable of vertically adjustably engaging with the inlet pipe by the inner circumference of the outer pipe of the tubular member. The upper section above the flange of the inlet pipe forms into an annular retaining part composed of spacings mostly in definite arrangement thereby permitting adjustment of the valve in height in relation to the height of the water tank and regulation of the water level in the tank. The valve arrangement disposed on the top end of the tubular member includes a block the interior of which forms a valve house and a release valve, a rubber valve placed beneath the block and being closable and openable in respect of the opening at the upper end of inner sleeve pipe. A lever of the valve control device is pivotally connected at its base end to the support at the valve arrangement while the free end thereof extends transversely towards the disk portion of the valve body and pivotally connected to this end is a cylinder. An expansible and contractible rubber cap is provided at the outer circumference of the cylinder and opens downwardly. The central pipe inserted in the center of the inlet pipe is snugly engageable by its upper portion outer circumference with the inner circumference of inner pipe of the tubular member. While the lower end of central pipe is provided with a unidirectional valve, its upper end opening opposes the rubber valve.

5 Claims, 4 Drawing Sheets

INTAKE VALVE FOR TOILET TANK

BACKGROUND AND OBJECTS OF INVENTION

The present invention relates to a toilet tank intake valve, particularly to, a floatless intake valve for use in the control of water level thereby achieving water stoppage in the toilet tank and also capable of adjusting the water level at will.

It is known that the conventional intake valve used in the tank of a flush toilet consists of a water inlet pipe having at the upper end thereof an intake valve, a control unit for controlling the intake valve, a slender connecting rod connected to the control unit and a float bowl disposed at the end of this float arm. Owing to the presence of the slender float arm extending transversely in the toilet tank and the float bowl with a considerably large volume, not only is the valve cumbersome in its external appearance but the valve itself occupies most of the space inside the tank. Furthermore, since impetus to the float bowl to work the connecting rod and to control the valve comes from the buoyancy, in order to operate this valve there must be sufficient amount of water in the tank and by which thus results in the volume of the water tank being increased correspondingly and in the waste of water. Again, if it is desired to adjust the water level in the tank by this conventional intake valve, this can be accomplished only when the float bowl end of the connecting rod is forcibly bent upward or downward in order to make the level of the float bowl to be either higher or lower during full water level. Hence, with this valve the adjustment is difficult and in so doing it will likely damage the connecting rod causing the whole water intake valve to be unserviceable. At the same time, since the length of the water inlet pipe must remain constant and can not possibly be adjusted, it is impossible therefore that a single model of this valve can be adapted for use in water tanks of different heights and in this way, the valve lacks interchangeability in utility. In addition, in this kind of valve screws are mostly used for connection between the connecting rod and the valve control device, after use for some time these screws turn loose easily or even become rusted and broken so that the valve will not work properly or manipulation becomes impossible. It has also been found that with the conventional type of valve, water flows noisily during filling up of the toilet tank and following the ascent of the float bowl, the opening in the valve port gradually decreases and this again causes a change in the amount of inflowing water from being large to being small, thereby lengthening the time for the level of water to become full in the tank. Again, when leakage occurs constantly in the outlet valve of the water tank, since there is no possibility that the intake valve can be completely closed water will flow out continuously resulting in wastage of water. Difficulty arises next when there is a trouble and the valve needs to be repaired and a replacement. If often requires the use of tools or has to rely upon a plumber's hand to accomplish the job and is difficult for the user to attend to the replacement by himself, and this adds to the cost of maintenance. The entire intake valve of the conventional type with its large size and many protuberances appears again to be heavy and bulky, being disadvantageous to the management and packaging thereof and damageable during transportation.

It is the purpose of this invention to ameliorate the aforesaid disadvantages in the conventional water intake valve, and to provide a novel intake valve for use with flushing toilets.

Accordingly, it is an object of this invention to provide a toilet tank intake valve designed to be neat, compact and small in size having no slender float arm nor the float bowl.

It is a further object to provide a floatless water tank intake valve which can be independently adjusted in height in relation to the height of a water tank to facilitate the fitting thereof and regulation of the water level in the tank, the regulation thereof being convenient, rapid and precise.

It is yet another object of the invention to provide a floatless water tank intake valve in which water discharge is kept constant such that time required for the tank to be at full water level is shortened, and the flow of water is quiet.

It is yet an additional object of the invention to provide a floatless water tank intake valve which, when there is a slight leakage in the tank or the outlet valve, is capable of maintaining the intake valve continuously closed to avoid a wastage of water.

It is yet a different object of the invention to provide a water tank intake valve in which maintenance, repair or replacement is very easy, and any person can accomplish the work by oneself.

A further object of the present invention is to provide a water tank intake valve adaptable to any conventional type or used water tank and capable of being designed to break through the configuration of the conventional type water tank since a water tank is not under limitation by the length of the conventional type float arm.

A still further object of the present invention is to provide a water tank intake valve which is easy to manufacture, assemble and mount and which after assembled into the component products is easy to manage and economical in packaging volume.

BRIEF DESCRIPTION OF THE DRAWINGS

Other objects and features of this invention will be apparent from the following detailed description of embodiments accompanied by drawing, in which:

FIG. 4 is an enlarged view showing details of the valve device in FIG. 2;

FIG. 5 is a partial sectional view of the essential part in another embodiment of the invention;

FIG. 7 is a view similar to FIG. 2 showing an upper end of the valve in an enlarged manner.

DETAILED DESCRIPTION OF A PREFERRED EMBODIMENT

Figure 1:
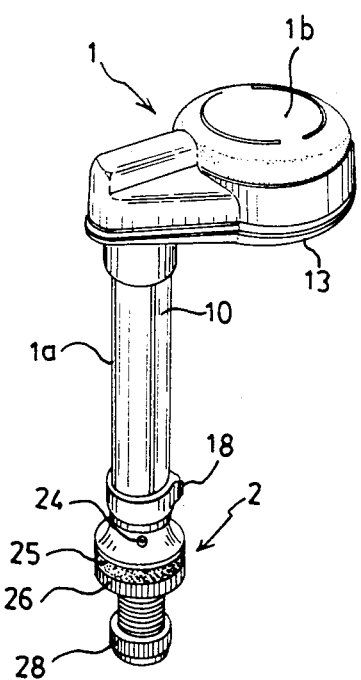
FIG. 1 is a perspective view of a water intake valve in accordance with the invention.
Figure 2:
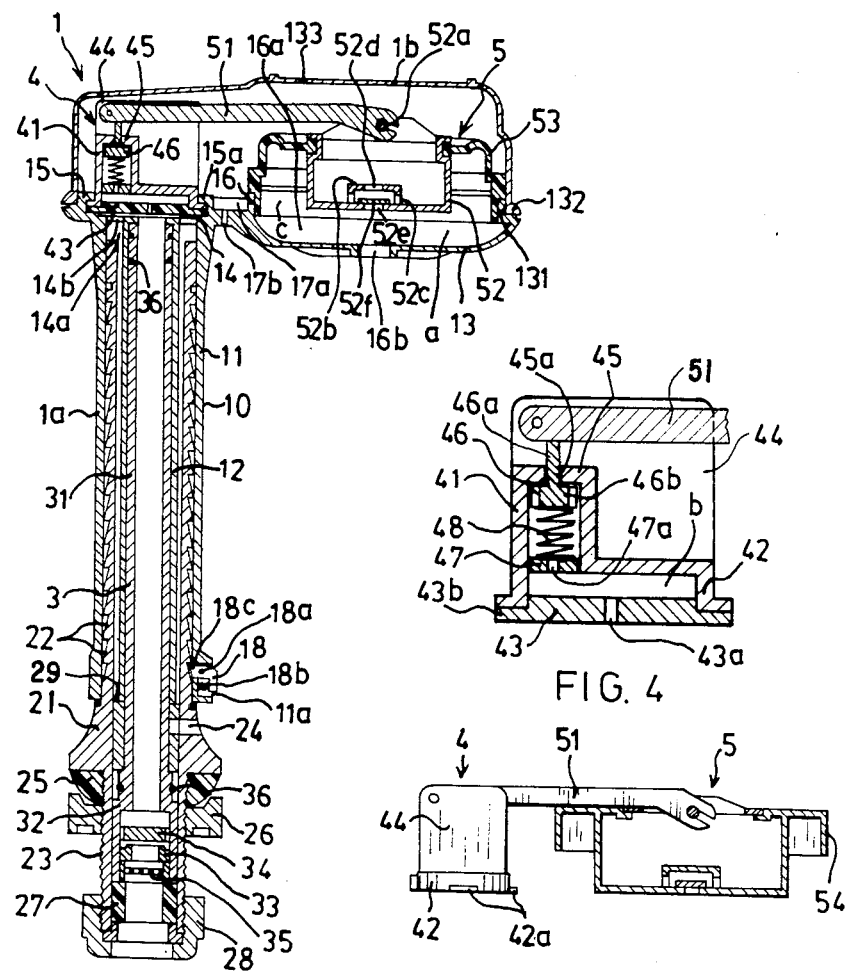
FIG. 2 is a sectional view of the intake valve according to the invention.
Figure 3:
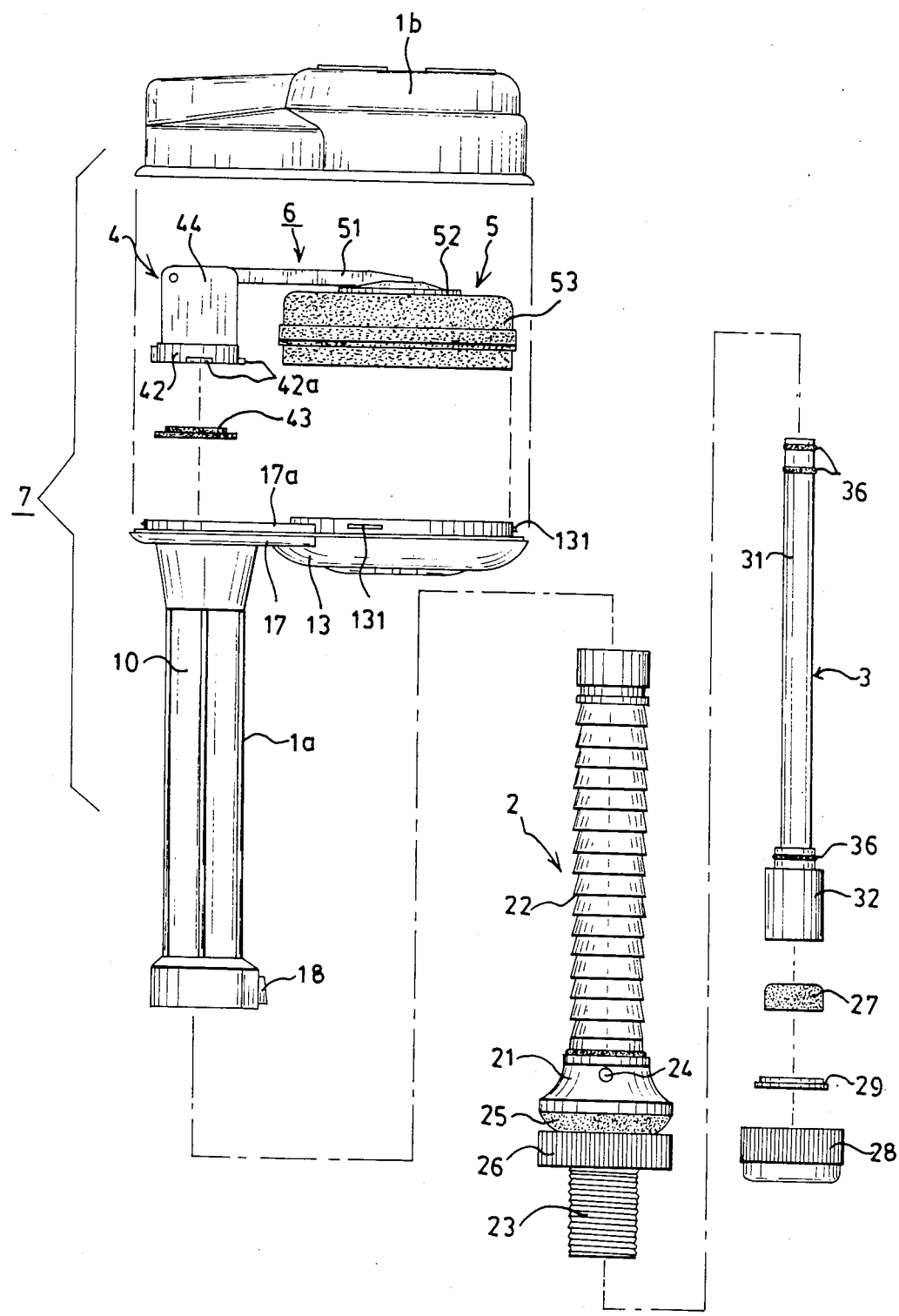
FIG. 3 is an exploded new of the intake valve according to the invention.

There is shown in FIGS. 1 through 3 a floatless water tank intake valve of the present invention, which comprises a valve body 1, a water inlet pipe 2 inserted in the tubular portion of the valve body 1, a central pipe 3 inserted in the center of the inlet pipe 2, a valve device 4 disposed in the upper chamber of the valve body 1 and a valve control device 5 mounted on the valve device 4.

The valve body 1 includes a tubular portion 1a having a dual sleeve pipe 10 formed in a concentrically disposed manner by an outer tube 11 and an inner tube 12 and a disc member 13 extending horizontally and outwardly from the top end of the dual sleeve pipe 10, and an inverted ladle shaped cover 1b. The outer tube 11 and the inner tube 12 join and form into an integral body by means of a circular plate 14 having at the center thereof a through hole 14a which passes into the top end of the inner tube 12 and in the periphery thereof a plurality of through holes 14b which pass into the top end of the outer tube 11. This circular plate 14 has in the surroundings thereof an upwardly projected circular enclosure wall 15, whose inner wall is provided with a plurality of protuberances 15a for retaining the valve device 4. The disk member 13 is formed with a large circular cavity 16a defined by a circular short enclosure wall 16, the large circular cavity 16a being spaced apart by a distance and lying side by side with a small circular cavity defined by the circular encompassing wall 15. These two cavities are interconnected by a connecting plate 17 having a reinforcing rib 17a thereon (see FIG. 3). The large circular cavity 16a is provided at the center thereof with a water intake round hole 16b and the encompassing walls 15 and 16 are provided on the outer circumferential walls thereof with several engaging projections 131 for engagement with the cover 1b having at the inner walls thereof corresponding engage grooves 132 to cover the upper portion of the disk member 13. The inside space formed in the place between the cover 1b and the disk member 13 after the latter has been properly covered by the former includes a control compartment a and a valve chamber b at the upper portions respectively of the large and the small cavities as will be described hereafter.

On the connecting plate 17 described above there is formed a through hole 17b. On the circumferential wall at the lower end of the outer tube 11 of the dual sleeve pipe 10 is provided a locking hole 11a. Pivotally connected by means of a pivot pin 18a to the inside of this locking hole is a lock means 18. This lock means 18 has at the upper end thereof a tooth portion 18c which under the tension force of a spring 18b normally projects through the locking hole 11a into the interior of the outer tube 11 to be engaged in the engaging portion provided on the outer circumferential wall of the water inlet pipe 2 as will be described hereafter.

The water inlet pipe 2 is a tubular body adjacent a lower portion of which being formed a flared flange 21. On the circumference of the tubular body at the upper portion of this flange 21 there is formed a multisection annular engaging portion 22 having a saw-tooth sectional shape. On the circumference of the tubular body at the lower portion of the flange 21 is formed a threaded portion 23. The flange 21 is provided at the upper portion thereof with a water outlet 24 which passes through the tubular wall. On the threaded portion 23 are fitted from top to bottom in serial order a sealing ring 25, a fixing nut 26, a sealing ring 27, a washer 29 and a coupling nut 28. Such fitting members are employed for fixing the water inlet pipe in the water tank and for connection with the supply pipe 91. At a location below the water outlet 24 of the flange 21 there is arranged at the lower end of the inlet pipe 2 a ring seat 29 for retaining a shoulder of the large diameter of the central pipe 3 in the seat 29.

The central pipe 3 is installed by being inserted into the lower end of the water inlet pipe 2. This central pipe 3 consists of a slender tubular portion 31 having an outer diameter appropriately insertible in the inner tube 12 of the valve body 1 and a large diameter tubular portion 32 formed at the lower end of the tubular portion 31 with an outer diameter appropriately insertible in the threaded portion 23 of the inlet pipe 2 and retainable in the ring seat 29. The inner wall of the large diameter tubular portion 32 is formed into a multisection stepped compartment. Mounted in the compartment is a floatable plate-like plastic valve disk 33. The ends of the compartment are closed off by a valve seat 34 and a preferred round plate 35 so that the valve disk 33 can be moved freely inside that large diameter tubular portion 32 to close and open the valve seat 34. The slender tubular portion 31 of the central pipe 3 carries water sealing rings 36 on the outer circumference at the upper and lower ends thereof to keep the space between the central pipe 3 and the inner tube 12 of the valve body 1 water-tight.

The valve device 4 consists of a valve block 41 having a cylindrical portion 43. By means of lock projections 42a formed on the outer circumference of the cylinder portion 42 at the lower end thereof the valve piece 41 can be locked releasably in the protuberances 15a of the valve chamber b and thus is fixed in the upper end of the valve body 1. A rubber diaphragm valve 43 having a raised middle portion is sandwiched between the valve block 41 and the circular plate 14 for sealing the opening at the upper portion of the cavity. The small opening 43a is formed in the raised middle portion, and a ring projects radially outwardly from the middle portion. The top surface of the cylinder portion 42 of the valve piece 41 is formed with a pair of parallel and upwardly projecting plates 44 and constitutes a lever support for pivotally fitting a lever as will be described hereinafter. Between the inner walls of the two projecting plates 44 there is disposed a hollow cylinder body 45 having at the top surface an air exit hole 45a which communicates with an interior large round space. Inside the large round space of this cylinder body 45 is provided a release valve 46 having at the center a shaft 46a which projects into the upper portion of the air exit hole and is provided on the circumference thereof with a plurality of axial notches 46b for passage of water, a valve seat 47 sealing the opening at the lower part of the hollow cylinder body 45 and provided at the center with a valve opening 47a and a release valve spring 48 disposed between the valve seat 47 and the release valve 46 and constantly biasing the release valve 46 upwardly.

The valve control device 5 which is mounted in the control compartment a, comprises a lever 51 whose base end is disposed between the two projecting plates 44 and pivotably connected thereto. A free end of the lever 51 extends towards the control compartment. A cylinder 52 is movably pivoted on the free end of the lever 51, and an expansible rubber cap 53 has its upper edge tightly confined in a ring groove 52a disposed at the upper portion of the cylinder 52. The cylinder 52 has at the center of the bottom thereof a small valve chamber 52a which is provided in the circumferential wall thereof with several openings 52c and at the upper and lower ends thereof respectively with a hole 52d, 52e. A valve plate 52f is housed in the valve chamber 52b, this valve plate 52f normally sealing the hole 52e. The lower circumferential edge of the rubber cap 53 is tightly engaged in the inner wall of the encompassing wall 16 of the cavity 16a. Between the cavity 16a and the rubber cap 53 there is formed a sealed space c. Furthermore, there is mounted about midway on the lever 51 a projecting pin 51a which passes through and projects out from a small hole 133 provided on the cover 1b. The function of this projecting pin 51a will be described later.

Figure 6:
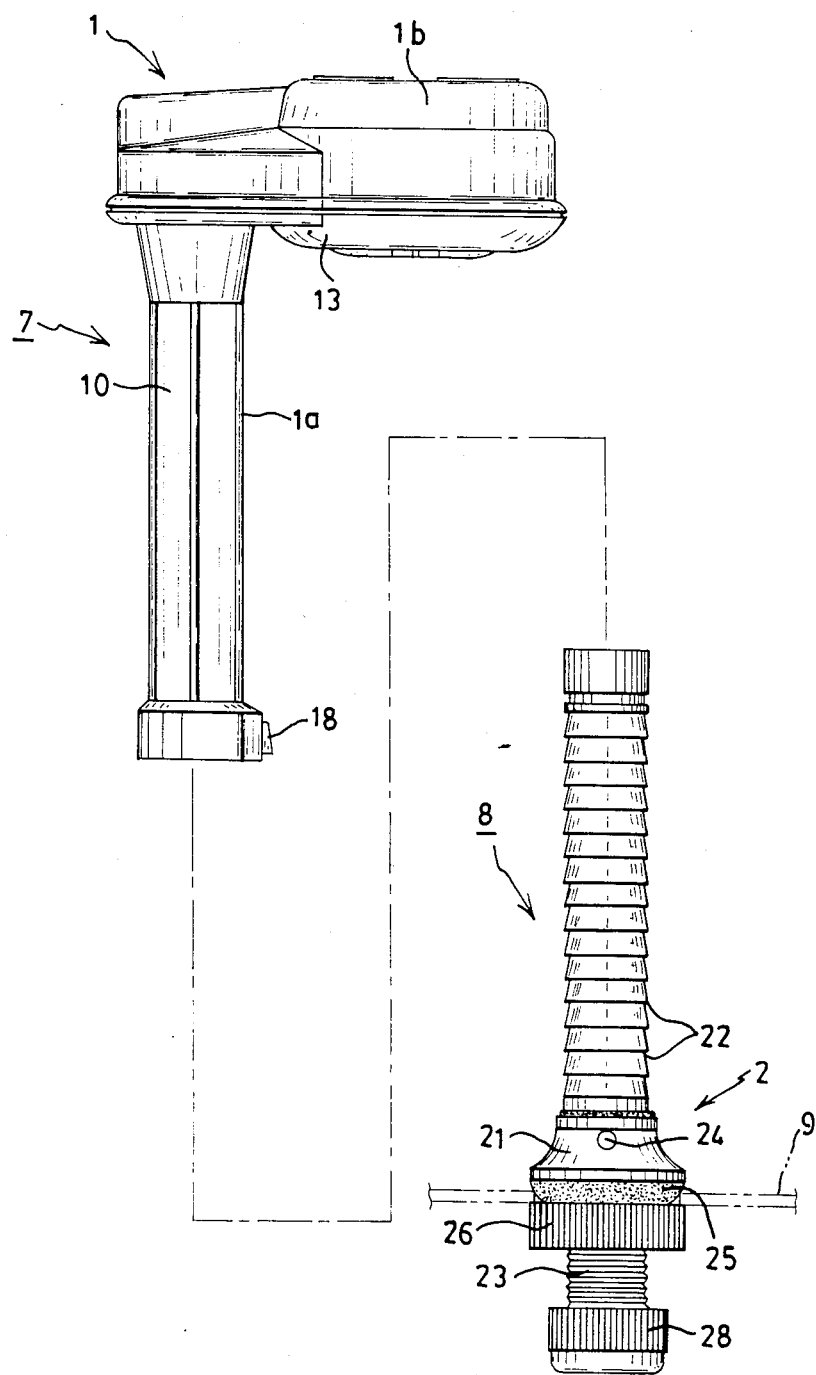
FIG. 6 is a schematic view of the fitting together of the intake valve according to the invention.

The intake valve of the present invention is preferably made by plastic molding and is assembled by fitting the various members, as shown in FIG. 3, together in the following way. A valve assembly 6 of the valve device 4 and the control device 6 already fitted as an unit is fixedly mounted on the upper portion of the tubular part 1a of the valve body 1 by rotating the former in a positive direction after the piece 41 has been engaged in the valve chamber b, so as to lock the projections 42a underneath the protuberances 15a. However, before doing so, the control device 5 must be appropriately received in the compartment a at this time. Thereafter, the disk member 13 is covered with the cover 1b to form a valve assembly 7 as shown in FIG. 6. On the other hand, the central pipe 3 already fitted at the lower end thereof with the valve disk 33, the valve seat 34 and the perforated plate 35 is inserted into the lower end of the water inlet pipe 2 until the shoulder of the large diameter tubular portion 32 thereof has been stopped at the ring seat 29. The water check ring 27 and washes 29 then inserted into the lower opening of the water inlet pipe 2 and next the sealing ring 25, the fixing nut 26 and the connecting nut 28 are mounted on to the threaded portion 23 to form a pipe assembly 8 (see FIG. 6). This assembly 8 is subsequently inserted from below into the dual sleeve pipe 10 of the assembly 7 and, in this way, the two assemblies 7 and 8 are fitted together by the lock means 18 being engaged in the engaging portion 22 to form a final intake valve as depicted in FIGS. 1 to 2. While the assembly 8 is being inserted into the assembly 7, the water inlet pipe 2 and the central pipe 3 will be automatically closely engaged in the outer tube 11 and the inner tube 12, respectively. Virtually all of the assembling work mentioned above can be completed solely by hand by movements like mere turning round into position, pressing into engagement and insertion. In this way, the production efficiency can be greatly increased since no tools are needed.

In mounting the intake valve of the present invention in a toilet tank 9 such is shown in FIG. 6, the inlet pipe assembly 8 is first inserted upright in a fitting hole in the tank 9 and, subsequently by means of the connecting nut 28 the end of pipe 2 is connected to the water supply pipe 91 which leads to the source of water, and fixed in position by screwing up the fixing nut 26 tightly. After the inlet pipe 2 has been properly mounted, the valve body assembly 7 with the dual sleeve pipe 10 is next fitted on to the inlet pipe 2 until a required height has been attained and after it has been released, the assembly 7 will thus be located in that position by the lock 18. In adjusting the height of the assembly 7, i.e., to adjust the height of the water level, if the assembly 7 is to be adjusted low, by pressing the assembly 7 downward slightly in relation to the assembly 8, this assembly 7 can thus be made to slide down lightly on the inlet pipe 2. If however the assembly 7 is to be adjusted high, then by pressing with finger on the lower end of the lock means 18 the assembly 7 can be concurrently lifted upward from the inlet pipe 2 until the required position therefor has been reached.

When finished with the mounting of the intake valve of the invention, there is no water in the tank yet. Because of its own weight, the control valve 5 descends and thus rotates the level 51 downwardly. The base end of the lever presses the release valve 46 down to open the hole 45a. Hence, the chamber b communicates with the outside atmosphere, whereas the diaphragm valve 43, owing to its normal configuration, closes the opening 14a of the inner pipe 12. Water is introduced into the inlet pipe 2 from the supply pipe 91. From the lower end of this inlet pipe 2 a stream of water will then flow into the central pipe 3 and from the upper end of this pipe 3 water will jerk open the rubber valve 43 and through the holes 14a and 14b to flow into the outer tube 12. Water will pass through the upper opening of the inlet pipe 2 and will flow downwardly and out of the lower water outlet 24 into the toilet tank 9. The water level will gradually rise in the tank and, when the level has risen above the bottom face of the disk member 13, water will flow through the intake hole 16b into the compartment c which is surrounded by the rubber cap 53, permitting the level of water to rise gradually in the compartment. At the same time, the cylinder 52 also floats up gradually and also a small volume of water flows through the small opening 52e at the center of the cylinder 52 and enters the cylinder. When water level in the compartment c has gradually increased, the volume of space above the water surface will decrease accordingly whereby the pressure of the space increases. Hence, the rubber cap 53 will expand as a result of the air pressure present in that space. In this way, the lever 51 moves upward about the pivot pin which serves as a fulcrum at the terminal end and the release valve 46 which has been pressed down before is now raised up to close the air exit hole 45a by the force of the spring 48. Now, the space b above the valve 43 becomes a sealed space. Water continues to flow through the hole 43a into that space and the water level rises at the same level as that in the compartment c. In this way, water continues to increase in amount and pressure inside said space. Because of the different pressure areas of the opening of the inlet pipe 2 and the chamber b, the valve 43 is forced to close the through hole 14a so that inflowing water stops when a predetermined water level has been reached in the tank 9.

In flushing, the flush handle is pressed down to open the outlet valve (not shown in the drawings) whereby water from the tank will flow in a large amount through the water outlet into the bowl to effect flushing action there. Following a rapid falling in the water level in the tank, water from the chamber c flows out rapidly through the hole 16b and at the same time there is produced a suction action which in addition to the weight of the water-filled cylinder 52, allows the rubber cap 53 to contract. Following this action the free end of the lever 51 is likewise lowered and a rear end of the lever presses down the release valve 46 thereby opening up the air exit hole 45a. Accordingly, the pressure in space b is retrieved and only a small amount of water pressure is pressing on that valve 43. However, as water pressure coming in through the central pipe 3 from the inlet pipe 2 is greater than the water pressure above the valve 43, this valve 43 is opened by the inflowing water and the supply of water proceeds again in the manner described above until full water level is attained.

FIG. 5 illustrates another embodiment of the present invention which is similar to that described above except that in the valve control device 5' the above mentioned rubber cap 53 is replaced by a hollow bottomed cylinder 54. Under the circumstances, such a hollow cylinder 54 constitutes substantially a float which will ascend along with a rise in the water level and descend along with a fall in the water level in the compartment c and accordingly will raise or lower the lever 51 in order to control the closing or opening of the release valve 46.

When a full water level has been attained during the use of the intake valve of the invention, should there be a slight but continuous leakage of water due to some defect in leakproofness of the pipe fitting portion or improper closing of the drain valve in the tank, the water level will gradually descend in the tank and will continue to fall until there is no water left in the tank. When the water level falls slowly no suction action is produced in the compartment c. Now, the valve control device 5 is still capable of preventing any wastage of water as the valve 43 will still close the through hole 14a tightly and no water will flow out. If gravity acting on the rubber cap 53 is not sufficient enough to overcome the pressure at the gas relief compartment and the summation tension force formed by the force of the spring 48 with the frictional force at the pivot portion, the lever 51 will not come down and no gas is relieved from the compartment. During this time, there is no more water stored in the tank. Consequently when the user presses down the flush handle and no water flushes out, it follows that the tank may possibly be leaking and early repairs may then be carried out. If it is desired at this time that the inlet valve continues to discharge water, this may be accomplished by uncovering the tank and next pressing down the projecting pin 51a so as to open the release valve 46. By this action, water from inside the pipe 3 will rush open the valve 43 and flow out. In this way, it is still possible to refill the tank with water.

If on the other hand, it is so designed that the weight of the rubber cap 53 and the cylinder 52 contained in the preceding lever 52 is greater than the afore-said air pressure and the spring force so that it may not require suction action to lower the lever, then in the leak condition noted above this lever will not of course have the effect in sealing of water and as such there will be no necessity in the provision of a projecting pin 51a. Again, in the cylinder 52 of the valve control device 5 there is provided a small-size unidirectional valve 52f which when water enters the compartment c will allow small amount of water to be able to pass through the opening 52e into the cylinder so as to increase the weight of the cylinder 52 thereby delaying the ascending time of the lever 51, that is, delaying the opening time of the releave valve.

It will be appreciated that when the intake valve of the present invention has been mounted in the toilet tank, not only the valve main body 1 is adjustable in relation to the height of the inlet pipe 2 but rotatably adjustable in 360° as well, hence suitable for use in any type of the tanks.

It should further be appreciated that having a construction as noted above this invention provides a neat and compactly arranged inlet valve which is easy to assemble and mount, adjustment of water level thereof being simple, maintenance and repair easy, suitable for any conventional or newly designed toilet tank, inflow of water noiseless and the flow always kept constant, capable of reducing the time of supply of water and also of water saving.

Many alterations and modifications may be made to the disclosed embodiments without departing from the spirit and scope of the present invention. The presently preferred embodiments have been illustrated by way of example only and for the sake of clarity and are not intended to limit the scope and breadth of the following claims.

What is claimed is:

1. A floatless intake valve for toilet tanks, comprising:
a water inlet pipe including an outwardly extending flange disposed adjacent a lower end thereof, an outer periphery of said inlet pipe disposed above said flange being of saw tooth configuration to define a plurality of vertically spaced annular teeth, a portion of said inlet pipe disposed below said flange being threaded, and a water discharge hole formed in said inlet pipe above said flange,
a valve body including a dual sleeve tubular member comprised of inner and outer coaxially arranged pipes, the upper ends of which being communicable with one another so that water traveling upwardly through said inner pipe may enter the upper end of said outer pipe and flow downwardly along said outer pipe and through said water discharge hole, said inlet pipe being insertable into said outer pipe, lock means extending through said outer pipe and into engagement with one of said teeth to retain said inlet pipe in a selected vertical position within said outer pipe, a disk portion extending transversely outwardly from an upper end of said tubular member, and a cover member detachably mounted on said disk portion to form therewith a space,
valve means disposed in said space above said tubular member and including a hollow valve block defining a diaphragm valve chamber at a lower end thereof and a release valve chamber at an upper end thereof, a diaphragm valve disposed in said diaphragm valve chamber and movable between an open position communicating said inner pipe with said outer pipe and a closed position blocking such communication, a release valve disposed in said release valve chamber and movable to open a hole in said block for exposing an upper side of said diaphragm valve to atmospheric pressure,
a valve control device disposed in said space and including a lever pivotably connected at one end to said valve means by a first pivot, a cylinder pivotably connected to another end of said lever by a second pivot, and an elastic cap connected to said cylinder and forming a downwardly opening compartment which is communicable with a toilet tank whereby said cap expands as the water level in the tank approaches an uppermost limit, said lever arranged for pivoting upwardly about said first pivot in response to expansion of said cap and pivoting downwardly about said second pivot in response to contraction of said cap, said lever operably arranged to actuate said release valve when said lever pivots downwardly, to expose an upper side of said diaphragm valve to atmospheric pressure, and
a control pipe insertable into said inner pipe in a water-tight manner, a check valve disposed in a lower end of said central pipe, an upper open end of said control pipe opposing said diaphragm valve such that water traveling upwardly through said central pipe impinges upon said diaphragm valve to open the latter when the upper side of said diaphragm valve is exposed to atmospheric pressure.

2. A floatless intake valve according to claim 1 wherein said disk portion includes a hole for communicating said downwardly open compartment of said elastic cap with a toilet tank.

3. A floatless intake valve according to claim 2 wherein said cap includes a circumferential wall with a lower edge engaging said disk portion in surrounding relationship to said hole in said disk portion.

4. A floatless intake valve according to claim 1 including a check valve disposed on a bottom of said cylinder for admitting water into said cylinder.

5. A floatless intake valve according to claim 1 wherein said valve block is detachably connectable to an upper end of said tubular member.

* * * * *